United States Patent [19]
Collins et al.

[11] Patent Number: 5,085,563
[45] Date of Patent: Feb. 4, 1992

[54] RECIPROCATING PUMP OR MOTOR

[75] Inventors: Wayne M. Collins; Michael R. Collins, both of Oconomowoc, Wis.

[73] Assignee: Collins Development Corporation, Milwaukee, Wis.

[21] Appl. No.: 470,909

[22] Filed: Jan. 26, 1990

[51] Int. Cl.$^5$ .............................................. F04B 17/04
[52] U.S. Cl. .................................................... 417/417
[58] Field of Search ................ 417/417, 418; 318/122, 318/125

[56] References Cited

U.S. PATENT DOCUMENTS

| | | | |
|---|---|---|---|
| 3,302,582 | 2/1967 | Kofink | 417/417 |
| 3,384,021 | 5/1968 | Perron | 417/417 |
| 3,649,893 | 3/1972 | Lajoie | 318/122 |
| 3,931,554 | 1/1976 | Spentzas | 417/418 X |

Primary Examiner—Gerald A. Michalsky
Attorney, Agent, or Firm—Foley & Lardner

[57] ABSTRACT

A linear motion reciprocating pump having a cylindrical housing, a magnetically permeable plunger mounted for reciprocal motion in said housing, the plunger including an opening to permit the passage of fluid from one end of the housing through the plunger to the other end of the housing, a power coil mounted on one end of the housing for attracting the plunger toward the one end, a reset coil mounted on the other end of the housing for attracting the plunger toward the other end of the housing, an electrical circuit operatively connected to energize the coils, the circuit including means for alternately controlling the enerization of the coils in phase to reciprocate said plunger in the housing whereby the voltage across the energized coil crosses through zero causing the plunger to be expelled from the energized coil just prior to energization of the other coil.

10 Claims, 2 Drawing Sheets

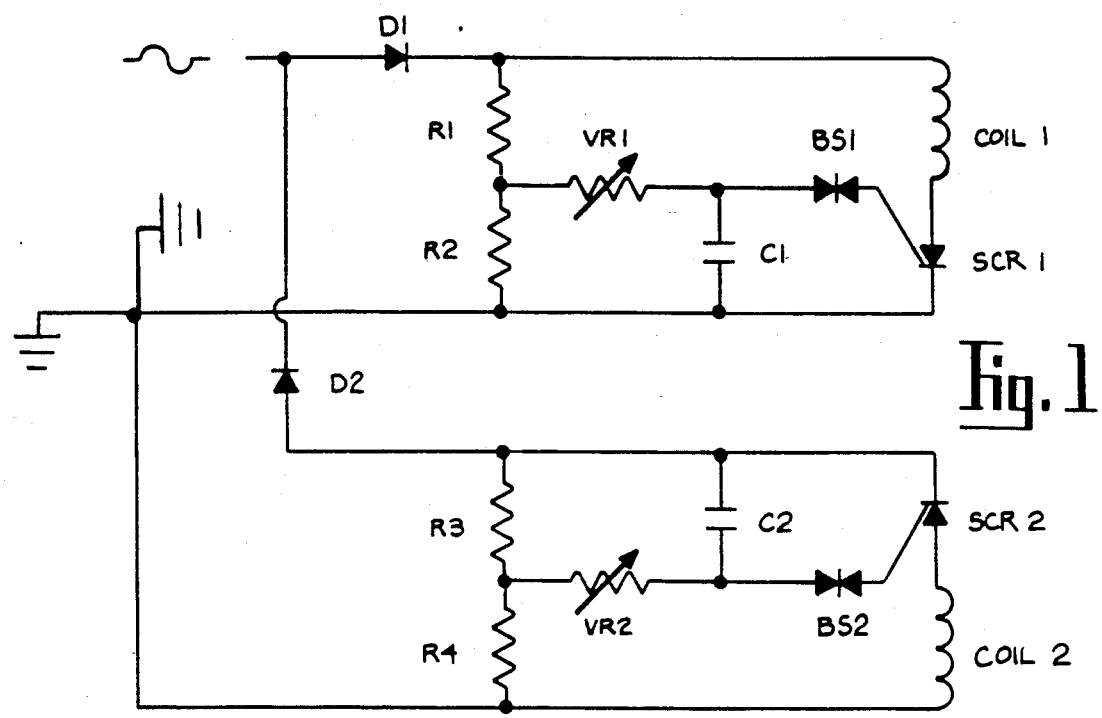
Fig. 1
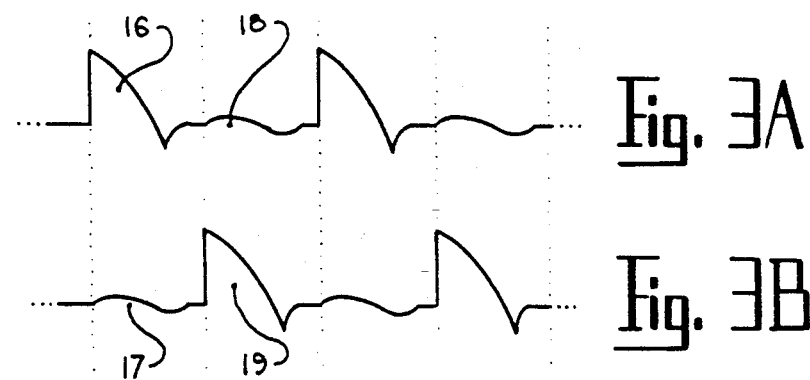
Fig. 3A
Fig. 3B

RECIPROCATING PUMP OR MOTOR

BACKGROUND OF THE INVENTION

1. Field of the Invention

This invention relates to reciprocal type pumps or motors and more particularly to linear type actuators which are controlled by solid state electrical circuits.

2. Description of the Prior Art

Rotational motors using bearings, seals, cams and/or linkages for pumping gases or liquids, or for direct drive of such tools as automatic saws, clippers, or linear actuators for control of machinery are well known.

Pumps of this type are described in prior patents such as U.S. Pat. No. 3,437,044 entitled "Fluid cooled double solenoid pumping mechanism", dated Apr. 8, 1969, and U.S. Pat. No. 3,282,219 entitled "Double acting solenoid pump", dated Nov. 1, 1966. Pumps of this type are described in these patents and are driven by a relay which alternately energizes two coils. Relays operate much too slowly and have too short a life expectancy to make these pumps practical. Other reciprocating plunger type pumps presently on the market such as automotive fuel pumps and refrigeration pumps use a single coil to move the plunger in one direction and a spring to return the plunger to its initial position. The springs are subject to fatigue failure and cannot be controlled to provide variable pressure or flow. Reciprocating motion for machinery tools is accomplished by a rotating motor with various types of cams and linkages to convert rotary motion to linear motion. These devices are usually driven by a universal motor which has carbon brushes and a commutator. Life is shortened due to brush wear and mechanical linkage failure. The cost of components adds substantially to the manufacturing cost of devices of the type described above. Solenoids used for machine actuation are also generally of the spring return type and must be actuated from a separate clock, counter, or relay closure.

SUMMARY OF THE PRESENT INVENTION

The present invention relates to a linear pump or motor which includes a plunger or piston and two coils, each activated by a silicon controlled rectifier (SCR). Each coil can be activated independently in time. The front coil known as the power coil can be energized for a full one half wave of 60 hertz voltage or any portion of one half wave, for example an "on" period of 3 milliseconds rather than the 8.5 milliseconds of a full half cycle. This adjustment can be used to provide variable pressure or flow when used as a pump or variable stroke or thrust when used as an actuator. The same adjustability exists for the second coil called the reset coil. The reciprocating motion may be actuated at any time period such as one backward stroke and one forward stroke per minute, or at higher speeds (of 60 forward and backward) strokes per second or greater. When used as a liquid pump, flow through the plunger can be enhanced by the use of a magnetically assisted check valve mounted on the plunger.

One of the primary advantages of the invention is the simplicity of the pump or motor which can be controlled by the unique solid state current which is described herein.

Another advantage is the high speed of operation attainable with the unique solid state circuit.

A further advantage of the invention is the use of the medium flowing through the pump to cool the pump or motor.

One of the unique features of the invention is the absence of any seals in the motors or pumps which reduces the cost far below presently available pumps or motors. A further feature of the pump or motor is the increase in the operating life of the elimination of seals.

Other principal features and advantages of the invention will become apparent to those skilled in the art upon review of the following drawings, the detailed description and the appended claims.

DETAILED DESCRIPTION OF THE DRAWINGS

FIG. 1 is a schematic view of the solid state circuit according to the invention.

FIG. 3a-b is a diagram of the wave form of the coils.

Figure 4:
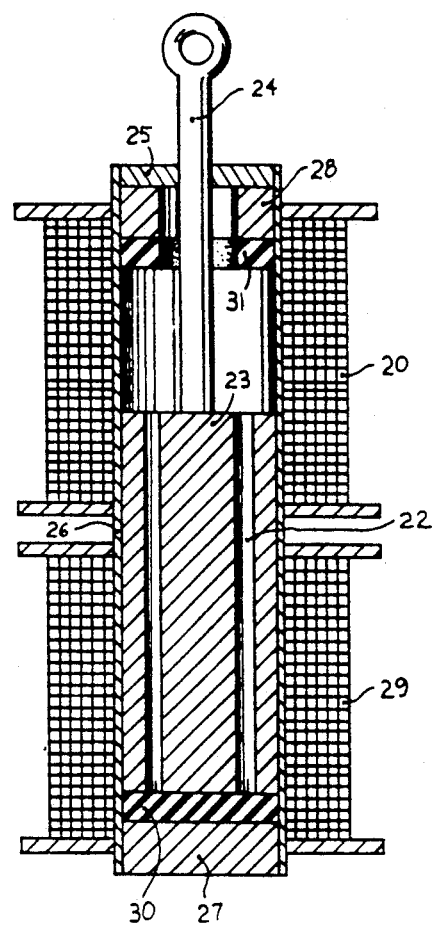

FIG. 4 is a cross section view of a linear motor which is controlled by the circuit.

Figure 5:
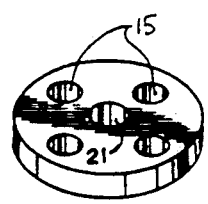

FIG. 5 is a perspective view of one of the flow control discs, which is mounted in the plunger.

Figure 6:
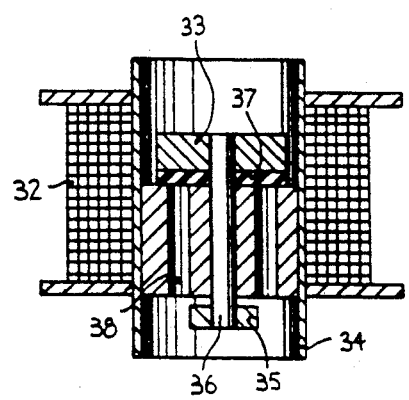

FIG. 6 is a view of a magnetically operated check valve which can be used with the motor or pump.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Figure 2:
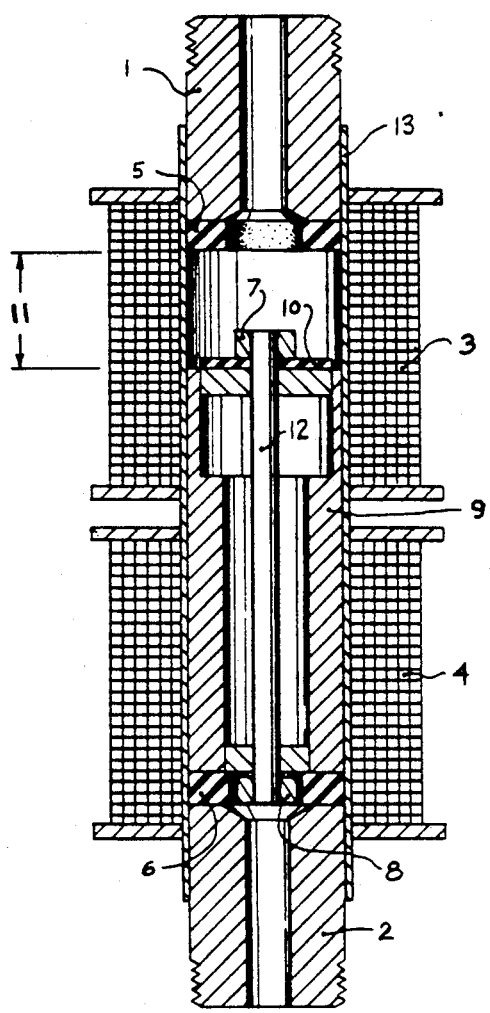
FIG. 2 is a cross section view of a linear pump which is controlled by said circuit.

A cross sectional view of a pump of the type contemplated herein is shown in FIG. 2. As seen in the drawing, the pump includes a cylindrical housing 13 having a fluid inlet 2 mounted on one end and a fluid outlet 1 mounted on the other end. The inlet 2 including a flow passage $2^1$ and the outlet 1 including a flow passage $1^1$.

A plunger 9 is mounted for reciprocal motion within the housing 13. Means are provided at each end of the housing to cushion the motion of the plunger 9. Such means is in the form of resilient bumpers 5 and 6. A power coil 3 is provided at the outlet end of the housing 13 and a reset coil 4 is provided at the inlet end of the housing 13.

The plunger 9 includes a bore 40 and a counter bore 42. A plate 44 as shown in FIG. 5 is provided in the counter bore 42 and a disc 46 is provided at the end of the bore 40. The plate 44 includes a center hole 21 and water flow holes 15 around the hole 21. The disc 46 includes a center hole 48 and a number of water holes around the periphery thereof (not shown). A stem 12 is supported in the holes 21 and 48 and includes a ferrous ring 7 at the power coil end of the cylinder and a ferrous ring 8 at the reset coil end of the cylinder 13.

Means are provided for controlling the opening and closing of the holes 15 in the plate 44 to control the flow of water through the bore 40 and counter bore 42. Such means is in the form of a rubber or plastic washer 10 which is provided on the stem 12 between the plate 44 and the ferrous ring 7. It should be noted that the ferrous ring 8 is mounted on the end of the stem 12 in a spaced relation to the disc 46. This spacing although small, 1/52 of an inch, is important to the operation of the pump as described hereinafter.

The solid state circuit as shown in FIG. 1 alternatively energizes the two coils: (power coil 3) and (reset coil 4) to reciprocate the plunger in the housing. A timing network is formed by variable resistors VR 1 and VR 2 which are used as timing resistors to determine the length of time required for capacitors C1 and C2 to charge to a level of 8 Volts DC. When one or the other of the capacitors C1 or C2 reaches 8 Volts DC, the corresponding bilateral switch BS1 or BS2 breaks down and conducts, causing the corresponding gate for the controlled rectifiers SCR 1 or SCR 2 to switch the SCR to the full on position to energize the coil. Diodes D1 and D2 serve two purposes in the circuit. They allow capacitors C1 or C2 to be charged to 8 Volts DC during each one half cycle of each 60 hertz cycle and prevent capacitors C1 or C2 from discharging if the coils are operated on every other cycle or every third cycle or any longer duration. They also prevent the counter EMF generated by coil (Power Coil 3) from interfering with AC line frequency or the counter EMF from coil (Reset Coil 4) from interfering with line frequency. Although the circuit shown utilizes SCR's, power transistors would serve equally well. At present SCR's are the lowest in cost and are for the time being the preferred device. The circuit is shown operating from 60 hertz frequency, therefore the speed of the plunger is limited to a total of 120 strokes per second. At this frequency, the pump is capable of providing water flow at 3 gallons per minute at a pressure of 60 psi. The device can also be operated at frequencies higher or lower than line frequency and is limited only by the inertia of the plunger.

Referring to FIG. 2 the plunger 9 is shown in the backward or reset position at the completion of the reset coil 4 pulse. In this position the ferrous metal end 8 of stem 12 is in the spaced position relative to the plunger 12 because the power coil 3 has just been energized and caused ferrous metal end 7 of stem 12 to be attracted to the plunger 9 to seat the washer 10 or the disc 44. The length of travel of the plunger 9 is shown by arrows 11.

The stroke of the plunger 9 is always started from midpoint of the coil for both the forward and backward strokes of the plunger. This location for the start of the stroke causes the ferrous ends 7 and 8 to always be initially attracted to the mass of plunger 9 just prior to the movement of the plunger. For example, when the power coil 3 is energized, the ferrous metal end 7 will move toward the plunger and the plunger 9 then moves through the power stroke. When the reset coil is energized, the ferrous end 8 will move into engagement with the plunger 9 and the plunger 9 will then move through the return stroke. Ferrous metal end 7 of stem 12 is attached to a rubber or plastic washer 10 which seals the water passage holes 15 in FIG. 5 to close and force water ahead of the plunger 9 on the power stroke. The water is discharged through rubber bumper 5 and passage 1¹. Water will also be drawn into the housing 13, through inlet passage 2¹ and the passage in plate 46 by the motion of the plunger 9.

Upon completion of the power stroke, reset coil 4 is energized and magnetically attracts ferrous end 8 of stem 12 toward the plunger 9. Since no washer is present on ferrous end 8 the effect is to cause washer 10 and ferrous end 7 to open and allow passage of water through the plunger and plate 44 into the vacant end of housing 13.

The stem 12 is made of nonferrous metal such as aluminum, brass, or stainless steel. In some applications the stem 12 may be omitted and the rubber washer 10 secured directly to the plate 44. The plunger 9 is magnetically permeable material but may be coated with a corrosion resistant coating. The housing 13 is made of nonferrous material such as copper, brass, stainless steel, or plastic. The pump can also be used under water if potted in an epoxy resin.

FIG. 3 shows the waveforms for the two coils 3 and 4. Since some transformer coupling takes place between the two coils through the ferrous medium of the plunger, it is important to observe phase when connecting the coils to the power source. The pump or motor performs best when the counter EMF created by the inductance of each coil acts to start the plunger in the other direction. It should be noted that the power curve for strokes 16 and 19 in FIG. 3 each have a smaller wave form 17 and 18 interposed between the power strokes as a result of the counter EMF induced in the coil by the magnetized plunger. This small waveform helps boost the return motion of the plunger and thereby avoids the problem of residual magnetism in coil, holding the plunger in the "off" coil. Power output is in fact boosted even more when the power strokes overlap somewhat.

FIG. 4 shows a motor connected to provide mechanical thrust to operate an air pump or other mechanical device. The same circuit is employed as in FIG. 1 and all other parts of the device are the same except the motor has a push rod 24 and bushing 25 to transmit thrust in a back and forth direction to the object to be actuated. Plunger 23 now has lubricant passages 22 to cool and lubricate plunger 23 and tube 26. Ferromagnetic material 27 and 28 are used to boost efficiency and bumpers 30 and 31 limit travel. For longer strokes coils 20 and 29 can be increased in length.

When used as a fluid pump at plunger stroke rates of 60 per second or more a check valve operated by water flow may not be fast enough. A magnetically operated check valve 39 as shown in FIG. 6 can be used on the outlet side of the pump for high pressure applications. Coil 32 is turned on simultaneously with the pump reset coil 4 to magnetically close gate 33 against rubber seat 37. Stem 36 acts as a guide and washer 35 limits plunger opening size. Water passes around gate 33 and through water passages in core 38.

The subject of this patent application, a linear motor, has numerous advantages over existing commercially available devices. When used as a fluid pump, high pressure and high flow rates can be obtained without seals, brushes, or bearing failure as encountered in small high pressure rotary pumps. The device provides a substantial cost advantage over larger high pressure pumps of the centrifugal type. For use as a mechanical actuator the device offers extremely high repetition rates, a built-in timer, and no complex linkages or brushes to wear out.

Thus, it should be apparent that there has been provided in accordance with the present invention a reciprocating pump or motor that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments in which an exclusive property or privilege is claimed are defined as follows:

1. A linear motion reciprocating pump comprising
a cylindrical housing,
a magnetically permeable plunger mounted for reciprocal motion in said housing,
said plunger including means to permit the passage of fluid from one end of said housing through said plunger to the other end of said housing,
a power coil mounted on said one end of said housing for attracting said plunger toward said one end,
a reset coil mounted on said other end of said housing for attracting said plunger toward said other end of said housing,
and an electrical circuit operatively connected to energize said coils,
said circuit including means for alternately controlling the energization of said coils in phase to reciprocate said plunger is said housing whereby the voltage across the energized coil crosses through zero, causing said plunger to be expelled through zero, causing said plunger to be expelled from said energized coil just prior to energization of the other coil.

2. The pump according to claim 1 wherein said circuit includes a pair of controlled rectifiers operatively connected to said coils and a pair of bilateral switches connected to said rectifiers for alternately energizing said rectifiers in response to energization of a corresponding pair of capacitors.

3. A pump according to claim 2 including a timing resistor connected to each of said capacitors for controlling the charge time of said capacitors.

4. A pump according to claim 2 wherein said plunger includes a stem axially aligned in said plunger and a ferrous member on each end of said stem.

5. A reciprocating pump comprising:
a cylindrical housing having an inlet and an outlet,
a magnetically permeable plunger mounted in said housing,
said plunger having a fluid flow passage through the center thereof,
a pressure responsive valve controlling the flow of fluid through said passage,
a power coil mounted on one end of said housing,
a reset coil mounted on the other end of said housing,
and an electrical circuit operatively connected to said coils, wherein said coils are energized in phase by said circuit,
said circuit including a timing network for alternately energizing said coils whereby the voltage across the energized coil crosses through zero just prior to the energization of the other coil whereby said plunger is expelled from said energized coil toward said other coil.

6. The device according to claim 5 wherein said circuit includes a pair of controlled rectifiers operatively connected to said timing network and to said coils and a bilateral switch connected to each of said timing networks and to each of said rectifiers.

7. A linear motion reciprocating pump comprising
a cylindrical housing,
a magnetically permeable plunger mounted for reciprocal motion in said housing, said plunger including means to permit the passage of fluid from one end of said housing through said plunger to the other end of said housing,
a power coil mounted on said one end of said housing for attracting said plunger toward said one end,
a reset coil mounted on said other end of said housing for attracting said plunger toward said other end of said housing,
and an electrical circuit operatively connected to energize said coils,
said circuit including means for alternately energizing said coils in phase to reciprocate said plunger in said housing wherein the magnetic field produced by the energized coil is reversed, whereby said plunger is expelled from said energized coil just prior to energization of the other coil.

8. A pump according to claim 7 further comprising a pressure responsive valve controlling the flow of fluid through said plunger.

9. A pump according to claim 8 wherein said circuit includes a pair of controlled rectifiers operatively connected to said coils and a pair of bilateral switches connected to said rectifiers for alternately energizing said rectifiers in response to energization of a corresponding pair of capacitors.

10. A pump according to claim 9 including a timing resistor connected to each of said capacitors for controlling the charge time of said capacitors.

* * * * *